Figure 1:
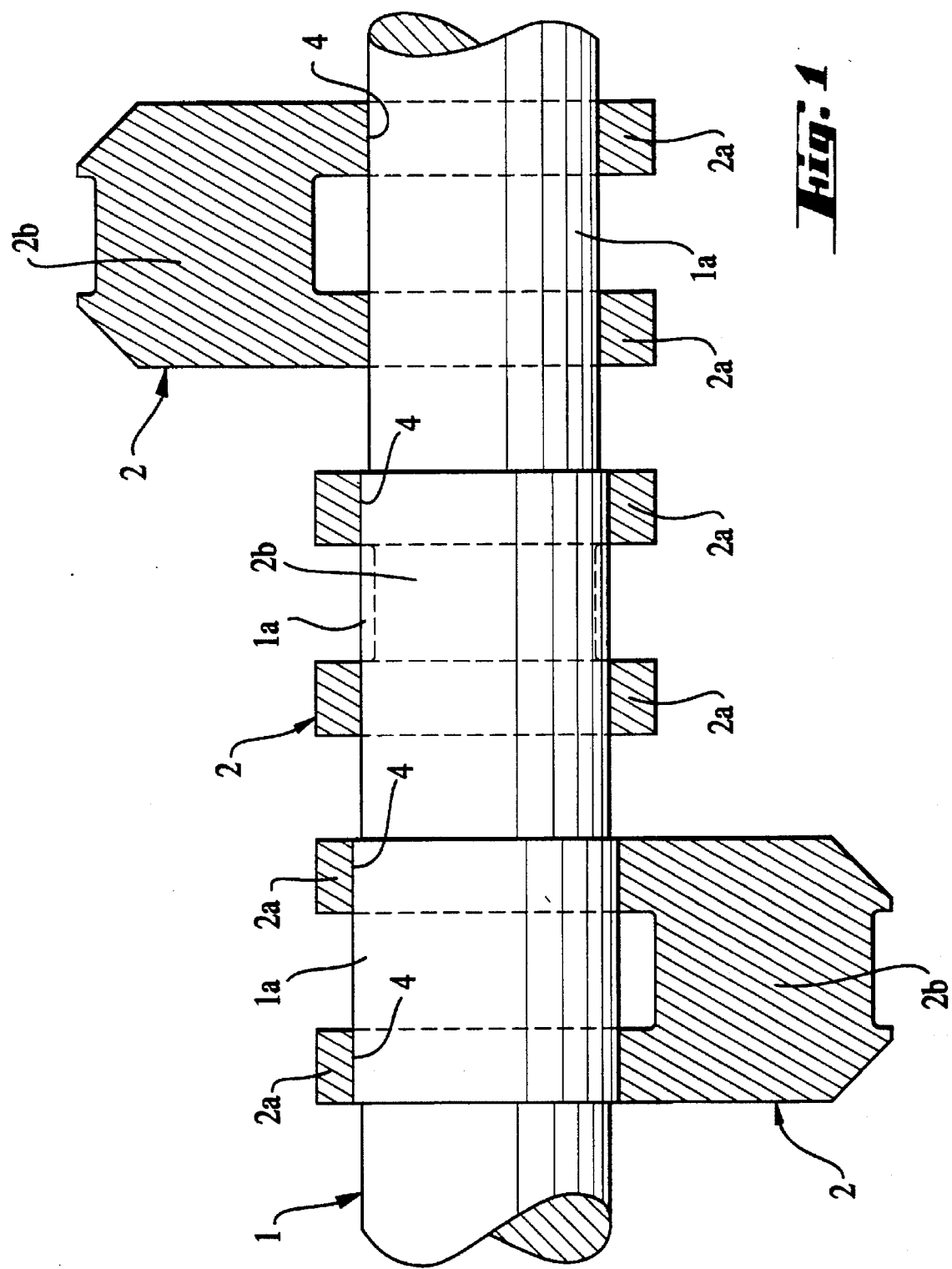

United States Patent [19]

Paro

[11] Patent Number: 5,625,945
[45] Date of Patent: May 6, 1997

[54] METHOD FOR MANUFACTURING A CRANKSHAFT FOR A COMBUSTION ENGINE WITH SEVERAL CYLINDERS

[75] Inventor: Daniel Paro, Kvevlax, Finland

[73] Assignee: Wartsila Diesel International Ltd. OY, Helsinki, Finland

[21] Appl. No.: 535,984

[22] Filed: Sep. 29, 1995

[30] Foreign Application Priority Data

Oct. 6, 1994 [FI] Finland .................................. 944675

[51] Int. Cl.$^6$ ................................................. B21K 1/08
[52] U.S. Cl. ........................................ 29/888.08; 74/595
[58] Field of Search ........................... 29/888.08, 888.1, 29/6.01; 74/595, 596, 597, 598

[56] References Cited

U.S. PATENT DOCUMENTS

| | | | |
|---|---|---|---|
| 637,515 | 11/1899 | Loutzky | 74/598 |
| 2,218,928 | 10/1940 | Towler et al. | 74/595 |
| 2,773,400 | 12/1956 | Sulger | 74/595 |
| 4,305,311 | 12/1981 | McGill . | |
| 5,088,345 | 2/1992 | Kemmler et al. | 29/888.08 |

FOREIGN PATENT DOCUMENTS

| | | |
|---|---|---|
| 0315136 | 5/1989 | European Pat. Off. . |
| 3446262 | 6/1986 | Germany . |

*Primary Examiner*—David P. Bryant
*Attorney, Agent, or Firm*—Smith-Hill and Bedell

[57] ABSTRACT

A method for manufacturing a crankshaft for a combustion engine with several cylinders, especially for a large diesel engine, the crankshaft including for each cylinder a crank web unit comprising crank webs transverse with regard to the crankshaft and a crank pin connecting the crank webs. Separate crank web units are assembled one at a time to a uniform shaft blank corresponding to the entire length of the crankshaft and having a different diameter in different points so that the diameter is at its biggest in the central part of the shaft blank and decreases towards the both ends thereof. First a crank web unit intended to the point of the shaft blank with the biggest diameter is installed and fixed to its place and after that crank web units intended always in the order of their diameter to the next biggest points are installed and fixed to both sides thereof. Lastly the portions located between the crank webs of each crank web unit at the position of the crank pin are machined away from the shaft blank.

7 Claims, 3 Drawing Sheets

1

METHOD FOR MANUFACTURING A CRANKSHAFT FOR A COMBUSTION ENGINE WITH SEVERAL CYLINDERS

The invention relates to a method for manufacturing a crankshaft for a combustion engine with several cylinders, especially or a large diesel engine, the crankshaft including for each cylinder a crank web unit comprising crank webs transverse with regard to the crankshaft and a crank pin connecting the crank webs.

A large diesel engine refers here to such engines that may be applied, for example, for main propulsion or auxiliary engines for ships or for power plants for production of electricity and/or heat energy.

The crankshafts of large diesel engines are conventionally entirely machined. They are manufactured by using either mould forging or so called continuing forging, whereby every crank web unit is forged separately to have nearly its final shape. A crankshaft is then assembled from the separate units so that crank web units with their crank pins are connected by a shrinkage fit to main bearing journals of the shaft until the desired crankshaft construction is obtained. A difficulty in this method is to make the crankshaft straight enough, since by using conventional shrinkage fits the result leaves often a great deal to be desired.

An aim of the invention is to obtain a new method for manufacturing a crankshaft for a large diesel engine. A further aim is to eliminate the above mentioned problem appearing in the known technique and to provide a method which is also in other respects technically advantageous and uncomplicated.

According to the invention separate crank web units are assembled one at a time to a uniform shaft blank corresponding to the entire length of the crankshaft and having a different diameter in different points so that the diameter is at its biggest in the central part of the shaft blank and decreases towards the both ends thereof. First a crank web unit intended to the point of the shaft blank with the biggest diameter is installed and fixed to its place and after that crank web, units intended always in the order of their diameter to the next biggest points are installed and fixed to both sides thereof. Lastly the portions located between the crank webs of each crank web unit at the position of the crank pin are machined away from the shaft blank. A uniform shaft blank ensures better straightness of a crankshaft and, notwithstanding, each crank web unit may easily be moved to the right point on the shaft.

The shaft blank comprises advantageously a set of cylinder portions steplike arranged axially in successive order and to which fixing of the crank web units takes part in a way known per se by using shrinkage fit or the like.

Alternatively, a shaft blank may be manufactured to be slightly conical tapering from its central part towards its both ends therefore. In this case fixing of the crank web units may be advantageously accomplished by utilizing a pressure medium joint known per se.

The diameter of the shaft blank at the position of the main bearings is advantageously machined smaller to its correct dimension. In this case a possible rounding of the base in connection with the crank web improving the strength properties of the construction may be accomplished to the shaft blank itself, which is of advantage from the view point of manufacturing technique.

In the following the invention will be described in more detail, by way of example, with reference to the accompanying drawing, in which

2

Figure 2:
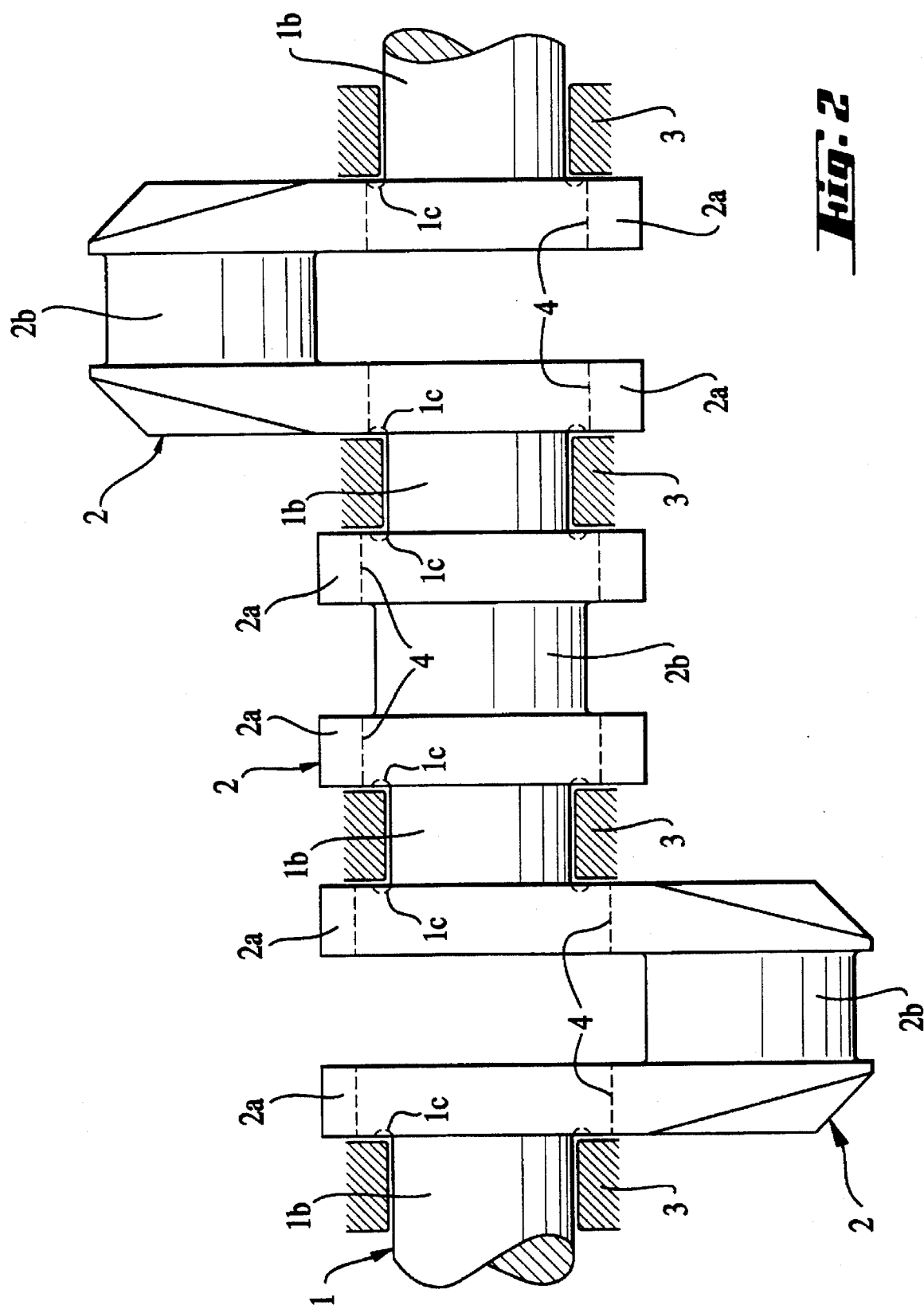
Figure 3:
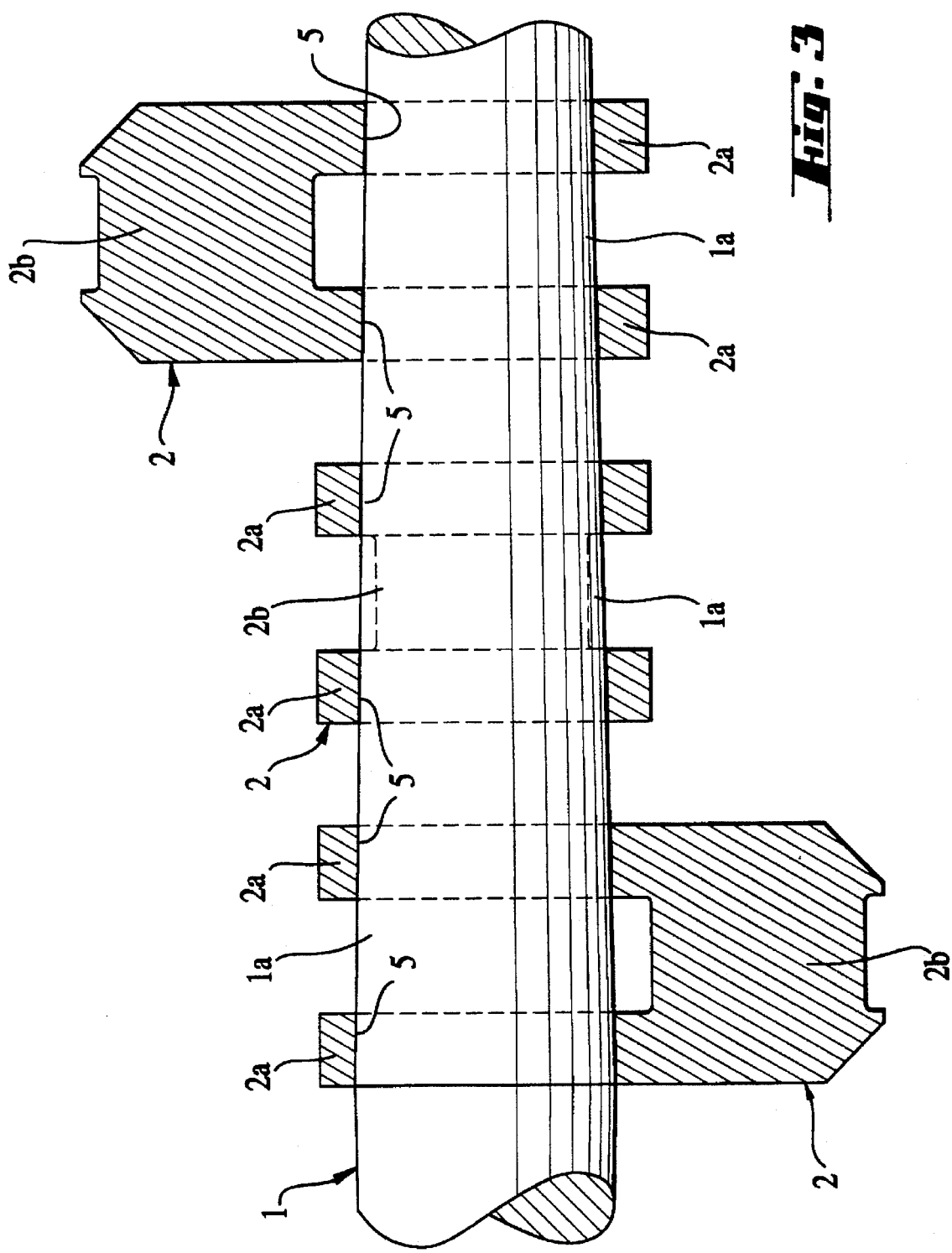

FIG. 1 shows schematically and partly in section a portion of a shaft blank with a number of crank web units installed thereto, FIG. 2 shows a corresponding arrangement, in which the shaft blank is machined to its final shape as a crankshaft, FIG. 3 shows a modification of the solution in FIG. 1.

In the drawing, 1 indicates a uniform shaft blank with a number of crank web units 2 installed thereto, one for each cylinder of an engine. A crank web unit 2 includes crank webs 2a and a crank pin 2b connecting these together and provided for a not shown connecting rod.

According to the invention the diameter of the shaft blank 1 is at its biggest in its central part and decreases towards the both ends thereof, whereby, first, a crank web unit 2 is installed to its place at a position where the diameter of the shaft blank is at biggest. After this the other crank web units 2 are installed on either side according to decreasing order of diameter of the shaft blank 1.

In the embodiment of FIG. 1 the shaft blank 1 comprise cylinder portions step-like arranged axially in successive order and to which the crank web units 2 are fixed in a manner known per se by using shrinkage fit or the like 4. In this case, if possible, it should be endeavored to warm the crank web units 2 in the first place only at the crank web 2a, so that the temperature of the crank pin 2b and of the portion 1a in the shaft blank 1 later to be machined away would not much differ from each other, because otherwise disadvantageous deflections may result after cooling.

The embodiment of FIG. 3 differs from the embodiment of FIG. 1 so that in this case the shaft blank 1 is slightly conical tapering from its central part towards the both ends. In this case fixing of crank web tab units 2 is with advantage carried out for example by utilizing a pressure medium joint 5, known per se. In this case a not-shown sleeve-like distance piece may be used as a fitting means in the fixing, the inner surface thereof corresponding to the slightly conical surface of the shaft blank 1 and the outer surface corresponding to a cylinder surface and, thus, being easily adaptable to the crank web unit 2.

After fixing the crank web units 2 to the shaft an 1, the latter is machined to its correct shape, which is illustrated by FIG. 2. The portions 1a of the shaft blank 1 at the position of the crank pins 2b are entirely machined off so as to enable rotation of the connecting rods to be installed to the crank pins 2b. Also bearing points 1b are machined to their correct shape to be supported to the structures of the engine block 3. In this case a possible rounding of the base 1c in connection with the crank web 2b improving the strength properties of the construction may be accomplished to the shaft blank 1 itself.

The Invention is not limited to the embodiments shown, but several modifications thereof are feasible within the scope of the attached claims.

I claim:

1. A method for manufacturing a crankshaft for a multi-cylinder combustion engine, said method comprising:

(a) providing a uniform shaft blank having two opposite ends and a central region, the shaft blank being of length corresponding to the entire length of the crankshaft and of diameter that decreases along the blank from the central region of the blank toward each end of the blank, (b) providing a plurality of crank web units, one for each cylinder of the engine, each crank web unit comprising crank webs that define a passage and are transverse to the passage, and a crank pin connecting the crank webs, (c) installing a first crank web unit on the shaft blank in the central region thereof, with the shaft blank extending through the passage defined by the crank webs, and fixing the first crank web unit in place on the shaft blank, (d) installing the other crank web units on the shaft blank, consecutively from the central region of the shaft blank to each end of the shaft blank, with the shaft blank extending through the passage defined by the crank webs of each crank web unit, and fixing the other crank web units in place on the shaft blank, and (e) machining away portions of the shaft blank between the crank webs of each crank web unit.

2. A method according to claim 1, wherein the shaft blank that is provided in step (a) comprises a plurality of length segments each of uniform diameter, and the diameter of the shaft blank decreases stepwise from the central region of the shaft blank, which constitutes one of said segments, toward each of the opposite ends thereof.

3. A method according to claim 1, wherein the shaft blank that is provided in step (a) comprises a plurality of length segments each of uniform diameter, and the diameter of the shaft blank decreases stepwise from the central region of the shaft blank, which constitutes one of said segments, toward each of the opposite ends thereof, and the method comprises fixing the crank web units on respective length segments of the shaft blank by shrink fitting.

4. A method according to claim 1, wherein the shaft blank that is provided in step (a) tapers conically from the central region of the shaft blank toward each of the opposite ends thereof.

5. A method according to claim 4, comprising fixing the crank web units on the shaft blank by utilizing a pressure medium joint.

6. A method according to claim 1, further comprising:

(f) machining the shaft blank between the crank web units to a reduced diameter for journalling the crankshaft in main bearings of the engine.

7. A method according to claim 6, further comprising:

(f) machining the shaft blank between the crank web units to a reduced diameter, and (g) machining away portions of the shaft blank to provide rounded edges between the shaft blank and at least some of the crank web of the manufactured crankshaft.

* * * * *